(12) United States Patent
Avila et al.

(10) Patent No.: US 12,007,577 B2
(45) Date of Patent: Jun. 11, 2024

(54) COMPACT IN-LINE REFLECTIVE OPTICAL BEAM EXPANDER OR REDUCER WITH ADJUSTABLE FOCUS

(71) Applicant: Raytheon Company, Waltham, MA (US)

(72) Inventors: Marco A. Avila, McKinney, TX (US); Justin R. Paul, Melissa, TX (US)

(73) Assignee: Raytheon Company, Tewksbury, MA (US)

( * ) Notice: Subject to any disclaimer, the term of this patent is extended or adjusted under 35 U.S.C. 154(b) by 412 days.

(21) Appl. No.: 17/453,568

(22) Filed: Nov. 4, 2021

(65) Prior Publication Data

US 2022/0179225 A1 Jun. 9, 2022

Related U.S. Application Data

(60) Provisional application No. 63/123,314, filed on Dec. 9, 2020.

(51) Int. Cl.
*G02B 27/09* (2006.01)
*G02B 19/00* (2006.01)
*G02B 27/14* (2006.01)

(52) U.S. Cl.
CPC ..... *G02B 27/0977* (2013.01); *G02B 19/0028* (2013.01); *G02B 27/14* (2013.01)

(58) Field of Classification Search
CPC . G02B 27/0977; G02B 27/14; G02B 19/0028

(Continued)

(56) References Cited

U.S. PATENT DOCUMENTS 4,919,528 A * 4/1990 Pitalo ................ F41G 3/323
356/138
4,989,951 A 2/1991 Miyano et al.
(Continued)

FOREIGN PATENT DOCUMENTS

| CN | 102608757 B | 10/2014 |
|----|----|----|
| FR | 2786938 B1 | 10/2001 |
| JP | 2008026643 A | 2/2008 |

OTHER PUBLICATIONS

Lavine et al., "Catoptric Focus Mechanisms for High-Energy Laser (HEL) Systems", U.S. Appl. No. 16/943,948, filed Jul. 30, 2020, 32 pages.

*Primary Examiner* — Wyatt A Stoffa
*Assistant Examiner* — Mitchell T Oestreich (57) ABSTRACT

An apparatus includes an in-line reflective optical system configured to receive an input optical beam and provide an output optical beam. The in-line reflective optical system includes first and second powered mirrors aligned back-to-back. The first powered mirror is configured to reflect the input optical beam as a first intermediate beam. The in-line reflective optical system also includes first and second reflective surfaces respectively configured to reflect the first intermediate beam as a second intermediate beam and to reflect the second intermediate beam as a third intermediate beam. The second powered mirror is configured to reflect the third intermediate beam as the output optical beam. A spacing between the first and second reflective surfaces and the first and second powered mirrors is adjustable to control a focus of the output optical beam without introducing boresight error in the output optical beam.

20 Claims, 9 Drawing Sheets

(58) Field of Classification Search
USPC .......................................................... 359/850
See application file for complete search history.

(56) References Cited

U.S. PATENT DOCUMENTS

| | | |
|---|---|---|
| 5,325,390 A | 6/1994 | Tidwell |
| 6,053,409 A | 4/2000 | Brobst et al. |
| 6,603,793 B2 | 8/2003 | Vetrovec |
| 6,746,121 B2 | 6/2004 | Ross et al. |
| 9,843,710 B2 | 12/2017 | Hamano et al. |
| 2018/0267299 A1 | 9/2018 | Sitter, Jr. et al. |
| 2021/0103056 A1 | 4/2021 | Braunreiter et al. |
| 2021/0383506 A1 | 12/2021 | Braunreiter |

* cited by examiner

FIG. 8

COMPACT IN-LINE REFLECTIVE OPTICAL BEAM EXPANDER OR REDUCER WITH ADJUSTABLE FOCUS

CROSS-REFERENCE TO RELATED APPLICATION AND PRIORITY CLAIM

This application claims priority under 35 U.S.C. § 119(e) to U.S. Provisional Patent Application No. 63/123,314 filed on Dec. 9, 2020, which is hereby incorporated by reference in its entirety.

TECHNICAL FIELD

This disclosure relates generally to optical systems. More specifically, this disclosure relates to a compact in-line reflective optical beam expander or reducer with adjustable focus.

BACKGROUND

In laser systems or other optical systems, an optical beam may need to be resized, such as by increasing (expanding) or decreasing (reducing) the optical beam's cross-sectional area. Typical beam expanders or reducers are implemented using either refractive optical elements or reflective optical elements. A refractive optical element refers to an optical element, such as a lens, through which an optical beam passes, where the optical beam refracts when passing into or out of the refractive optical element. A reflective optical element refers to an optical element, such as a mirror, having a convex, concave, or other reflective surface that reflects an optical beam. Unfortunately, typical beam expanders or reducers can suffer from various shortcomings, regardless of whether they use refractive optical elements or reflective optical elements.

SUMMARY

This disclosure provides a compact in-line reflective optical beam expander or reducer with adjustable focus.

In a first embodiment, an apparatus includes an in-line reflective optical system configured to receive an input optical beam and provide an output optical beam. The in-line reflective optical system includes first and second powered mirrors aligned back-to-back. The first powered mirror is configured to reflect the input optical beam as a first intermediate beam. The in-line reflective optical system also includes first and second reflective surfaces respectively configured to reflect the first intermediate beam as a second intermediate beam and to reflect the second intermediate beam as a third intermediate beam. The second powered mirror is configured to reflect the third intermediate beam as the output optical beam. A spacing between the first and second reflective surfaces and the first and second powered mirrors is adjustable to control a focus of the output optical beam without introducing boresight error in the output optical beam.

In a second embodiment, a system includes a laser configured to generate an input optical beam. The system also includes an in-line reflective optical system configured to receive the input optical beam and provide an output optical beam. The in-line reflective optical system includes first and second powered mirrors aligned back-to-back. The first powered mirror is configured to reflect the input optical beam as a first intermediate beam. The in-line reflective optical system also includes first and second reflective surfaces respectively configured to reflect the first intermediate beam as a second intermediate beam and to reflect the second intermediate beam as a third intermediate beam. The second powered mirror is configured to reflect the third intermediate beam as the output optical beam. A spacing between the first and second reflective surfaces and the first and second powered mirrors is adjustable to control a focus of the output optical beam without introducing boresight error in the output optical beam.

In a third embodiment, a method includes reflecting an input optical beam as a first intermediate beam using a first powered mirror. The method also includes reflecting the first intermediate beam as a second intermediate beam using a first reflective surface. The method further includes reflecting the second intermediate beam as a third intermediate beam using a second reflective surface. In addition, the method includes reflecting the third intermediate beam as an output optical beam using a second powered mirror. The first and second powered mirrors are aligned back-to-back. A spacing between the first and second reflective surfaces and the first and second powered mirrors is adjustable to control a focus of the output optical beam without introducing boresight error in the output optical beam.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, in laser systems or other optical systems, an optical beam may need to be resized, such as by increasing (expanding) or decreasing (reducing) the optical beam's cross-sectional area. Typical beam expanders or reducers are implemented using either refractive optical elements or reflective optical elements. A refractive optical element refers to an optical element, such as a lens, through which an optical beam passes, where the optical beam refracts when passing into or out of the refractive optical element. A reflective optical element refers to an optical element, such as a mirror, having a convex, concave, or other reflective surface that reflects an optical beam. Unfortunately, typical beam expanders or reducers can suffer from various shortcomings, regardless of whether they use refractive optical elements or reflective optical elements.

In some applications, for example, an optical beam expander or reducer may need to receive an incoming optical beam along an optical axis and output a resized optical beam along the same optical axis. Some refractive expander/reducer designs can help to keep an optical beam on axis, but the optical beam may be subjected to thermally-induced optical aberrations. For instance, radial thermal gradients may be created in a lens or other refractive optic when there is a constant flow of heat to or from a center of the refractive optic. Due to the poor or relatively-poor thermal conductivity of most refractive materials, this can lead to a significant temperature change within the refractive optic as a steady-state condition when a propagating optical beam is passing through the refractive optic. This temperature change can create optical aberrations such as wavefront distortions or thermal lensing. The optical aberrations created by the refractive optic can lead to small adjustments in the focus term of the propagating optical beam and can reduce the overall beam quality of the optical beam. These refractive expander/reducer designs can also be wavelength-dependent, which limits their effectiveness and versatility in multi-spectral designs. In addition, these refractive expander/reducer designs can have significant back-reflections in high-energy laser (HEL) applications or other applications, which can cause damage to other components or create other problems in larger systems.

Some reflective expander/reducer designs employ two offset reflective optics that are used to displace and resize an optical beam. Without correction, this means that an incoming optical beam is offset from an outgoing optical beam, which may be undesirable in various applications. In order to use these reflective expander/reducer designs in applications where an optical beam is input and output along the same optical axis, more optics and space are typically needed to bring the outgoing beam back into alignment with the optical axis of the incoming beam. However, this can lead to larger footprints and increase the size, weight, and cost of the designs. Also, off-axis reflective expanders/reducers cannot be used to provide adjustable focus for an optical beam or to successfully adjust collimation for initial beam divergence errors without introducing optical aberrations like line-of-sight errors and wavefront errors. This is because, in general, attempting to adjust a spacing between powered mirrors (such as a primary mirror and a secondary mirror) in these reflective expander/reducer designs can cause major boresight errors by altering the pointing vector of the outgoing beam and can introduce major wavefront errors in the outgoing beam.

This disclosure provides various realizations of a compact in-line reflective optical beam expander or reducer with adjustable focus. As described in more detail below, each optical beam expander or reducer includes two powered mirrors aligned back-to-back, where the powered mirrors include respective reflective surfaces. The reflective surfaces of the powered mirrors are designed to provide a desired expansion or reduction in the cross-sectional size of an optical beam (although the powered mirrors may provide no change in the cross-sectional size of an optical beam in other cases). The back-to-back alignment of the powered mirrors can help to ensure that the powered mirrors are properly aligned and spaced with respect to one another and remain in proper alignment and spacing with one another. In some embodiments, the powered mirrors of each optical beam expander or reducer are configured such that the axis of the input optical beam as received by the optical beam expander or reducer matches or substantially matches the axis of the output optical beam as provided by the optical beam expander or reducer.

In each of these optical beam expanders or reducers, an optical path of the optical beam between the powered mirrors follows an offset leg that provides separation of the powered mirrors, and an offset retro-reflective element is used with this optical path to reflect the optical beam. For example, the offset retro-reflective element may include two or more reflective surfaces, which can be part of a single integrated or monolithic optical device or parts of different optical devices. The offset retro-reflective element receives the optical beam from one of the powered mirrors and redirects the optical beam towards the other of the powered mirrors. Moreover, the offset retro-reflective element with the two or more reflective surfaces can be selectively moved towards or moved away from the powered mirrors, such as in a direction or along an axis that is transverse to the optical axis of the input and output beams. This can be done to adjust the focus of the output beam without altering the positions of the powered mirrors.

Each of these optical beam expander/reducer designs may enable an input optical beam to be received and an output optical beam to be provided along a single optical axis, which may allow a resized or other output beam to be provided along the same pointing vector as an input beam. The output beam may be collimated or slightly diverging depending on the position of the offset retro-reflective element relative to the powered mirrors. By adjusting the position of the offset retro-reflective element, the output beam's divergence can be increased, reduced, or collimated. Also, these optical beam expander/reducer designs may represent all-reflective designs, meaning there may be no refractive elements within these designs. This can greatly reduce the risk of thermal lensing; reduce or eliminate chromatic aberrations, wavefront distortions, or other optical aberrations; and reduce or eliminate back reflections (all of which can be significant performance challenges in a refractive design). Further, each of these designs may allow for beam resizing in a small footprint that maintains an original beam's pointing vector upon output from the beam expander/reducer. In some cases, this may allow the optical beam expander/reducer to be a modular component that can be installed or removed without otherwise affecting the pointing of a laser system or other system. Moreover, each of these designs may allow an optical beam to be precision-adjusted in order to compensate and correct for any thermally-induced focus terms in an HEL system or other system while maintaining the original beam's pointing vector. In addition, these designs can be compatible for use across multiple laser wavelength bands or other optical wavelength bands.

In this way, these designs provide reflective beam expanders or reducers that can maintain an optical pointing axis of an incoming optical beam and enable precision adjustable focus, which allows for focus-term correction without introducing strong aberrations, creating line-of-sight deviations, or requiring sensitive re-alignment whenever a powered mirror spacing changes. This type of functionality may find use in various types of applications, such as in various types of laser systems and other optical systems. Example types of optical systems that may use these designs can include HEL systems, continuous zoom short-wave infrared (SWIR) illumination systems, and real-time in-flight SWIR illumination systems.

Figure 1:
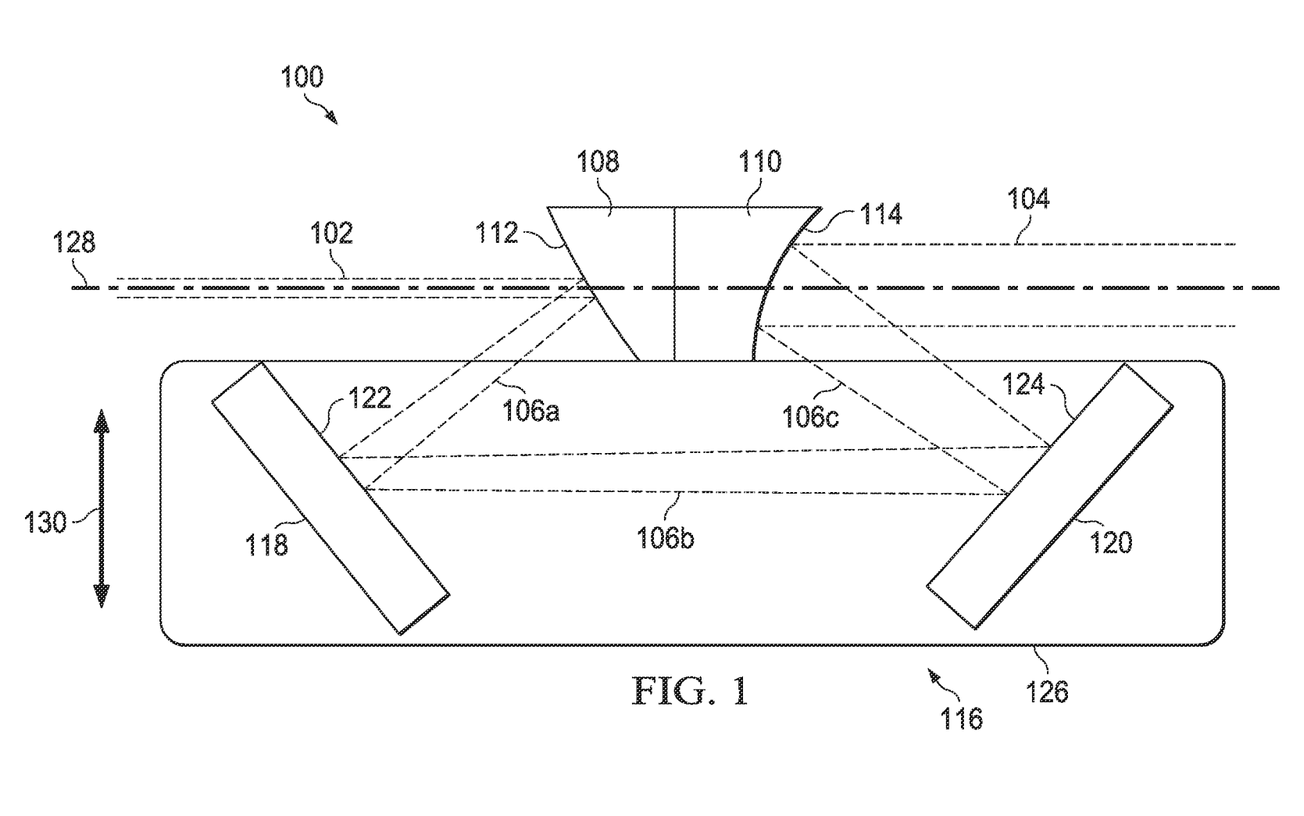
FIG. 1 illustrates a first example compact in-line reflective optical system with adjustable focus according to this disclosure.

FIG. 1 illustrates a first example compact in-line reflective optical system 100 with adjustable focus according to this disclosure. As shown in FIG. 1, in some embodiments, the system 100 is configured to receive an input optical beam 102 and provide an output optical beam 104, where the output optical beam 104 has a larger cross-sectional size than the input optical beam 102. The system 100 here operates to generate multiple intermediate beams 106a-106c, each of which may have an increasing cross-sectional size. In other embodiments, the input optical beam 102 and the output optical beam 104 can be reversed (meaning the input optical beam 102 enters on the right and the output optical beam 104 exits on the left in FIG. 1), where the output optical beam 104 has a smaller cross-sectional size than the input optical beam 102. The system 100 there operates to generate multiple intermediate beams 106c-106a, each of which may have a decreasing cross-sectional size. For purposes of the discussion below, it is assumed that the system 100 is functioning as a beam expander to generate the output optical beam 104 with a larger cross-sectional size.

In this example, the system 100 includes two powered mirrors 108 and 110. The powered mirror 108 represents a mirror having a reflective surface 112, and the powered mirror 110 represents a mirror having a reflective surface 114. The reflective surface 112 here has a convex shape, and the reflective surface 114 here has a concave shape. The convexity and concavity of the reflective surfaces 112 and 114 cause optical energy reflecting from the reflective surfaces 112 and 114 to change in cross-sectional size, which is why the mirrors 108 and 110 are referred to as "powered" mirrors.

As can be seen in FIG. 1, the powered mirror 108 is used to create an expansion in the cross-sectional size of an optical beam, and the powered mirror 108 is used to reduce or stop the expansion in the cross-sectional size of the optical beam. As a result, the output optical beam 104 has a larger cross-sectional size compared to the input optical beam 102. The powered mirrors 108 and 110 are also coupled to one another or otherwise arranged so that the powered mirrors 108 and 110 have a back-to-back alignment. This alignment indicates that the backs of the powered mirrors 108 and 110 face one another and that the powered mirrors 108 and 110 are aligned with one another. Note that the powered mirrors 108 and 110 may be coupled to one another directly or may be coupled to one another indirectly via one or more other components. Also note that the powered mirrors 108 and 110 may be coupled to one another or to one or more other components in any suitable manner, such as via an adhesive. In addition, note that while the powered mirrors 108 and 110 are shown here as being separate devices, the powered mirrors 108 and 110 may be implemented using a monolithic optic having the reflective surfaces 112 and 114 on opposite sides of the monolithic optic. The powered mirrors 108 and 110 can therefore be implemented in a number of ways. However fabricated, the powered mirrors 108 and 110 can have a desired spacing between the reflective surfaces 112 and 114.

The system 100 also includes a retro-reflective element 116, which generally operates to redirect optical energy received from the powered mirror 108 towards the powered mirror 110. In this particular example, the retro-reflective element 116 includes multiple mirrors 118 and 120. The mirror 118 includes a flat or substantially flat reflective surface 122, and the mirror 120 includes a flat or substantially flat reflective surface 124. The retro-reflective element 116 also includes an adjustable stage, plate, or other support structure 126 on which the mirrors 118 and 120 are mounted or otherwise attached. The retro-reflective element 116 receives the intermediate beam 106a from the powered mirror 108 at the mirror 118 and reflects the intermediate beam 106a from the mirror 118 as the intermediate beam 106b. The retro-reflective element 116 also receives the intermediate beam 106b at the mirror 120 and reflects the intermediate beam 106b from the mirror 120 as the intermediate beam 106c. The intermediate beam 106c is directed towards the powered mirror 110.

In this example, the input beam 102 reflects off the reflective surface 112 of the powered mirror 108 as the intermediate beam 106a. The convexity of the reflective surface 112 causes the cross-sectional size of the intermediate beam 106a to increase as the intermediate beam 106a travels towards the mirror 118. The planar nature of the reflective surface 122 of the mirror 118 allows the cross-sectional size of the intermediate beam 106b to continue increasing as the intermediate beam 106b travels towards the mirror 120. The planar nature of the reflective surface 124 of the mirror 120 similarly allows the cross-sectional size of the intermediate beam 106c to continue increasing as the intermediate beam 106c travels towards the powered mirror 110. The intermediate beam 106c reflects off the reflective surface 114 of the powered mirror 110 as the output beam 104. The non-planar nature of the reflective surface 114 helps to reduce or stop the increase in the cross-sectional size of the output beam 104. Depending on the configuration of the system 100, the output beam 104 may be substantially or completely collimated, or the output beam 104 may slightly diverge during its travel.

As can be seen here, the input beam 102 may travel along an optical axis 128, and the output beam 104 may travel along the same optical axis 128. Because the powered mirrors 108 and 110 are positioned along the optical axis 128 of both the input beam 102 and the output beam 104, the system 100 can be referred to as an "in-line" system. Moreover, the system 100 here includes reflective elements and not refractive elements, so the system 100 can be referred to as an "in-line reflective" system. One benefit of an all-reflective design for the system 100 is that very little thermal energy may be generated within the powered mirrors 108, 110 and within the mirrors 118, 120 via absorption of optical energy, which helps to reduce or avoid thermal-based optical aberrations.

The retro-reflective element 116 here is movable back and forth along an axis 130, which may be substantially or completely transverse to the optical axis 128 of the input beam 102 and the output beam 104. For example, an actuator may be used to move the support structure 126 of the retro-reflective element 116 closer to the powered mirrors 108 and 110 or farther away from the powered mirrors 108 and 110. This can adjust the focus of the output beam 104 on a target or other object or area being struck or illuminated by the output beam 104. This change of focus occurs because moving the mirrors 118 and 120 along the axis 130 changes the length of the optical path between the powered mirrors 108 and 110. In some embodiments, a processor or other controller can be used to sense divergence errors, thermally-induced lensing from refractive optics used in a larger system, or other focus errors. The controller can use this information to control the actuator and cause the actuator to position the retro-reflective element 116 in a suitable position to compensate for the focus errors.

Among other things, the retro-reflective element 116 here can be moved along the axis 130 to change the focus of the output beam 104 without moving the output beam 104 off the desired optical axis 128. In other words, the focus of the output beam 104 can be adjusted without altering the pointing vector of the output beam 104 as compared to the pointing vector of the input beam 102. Any changes in focus caused by the movement of the retro-reflective element 116 along the axis 130 may therefore result in little or no boresight errors being created.

Figure 2:
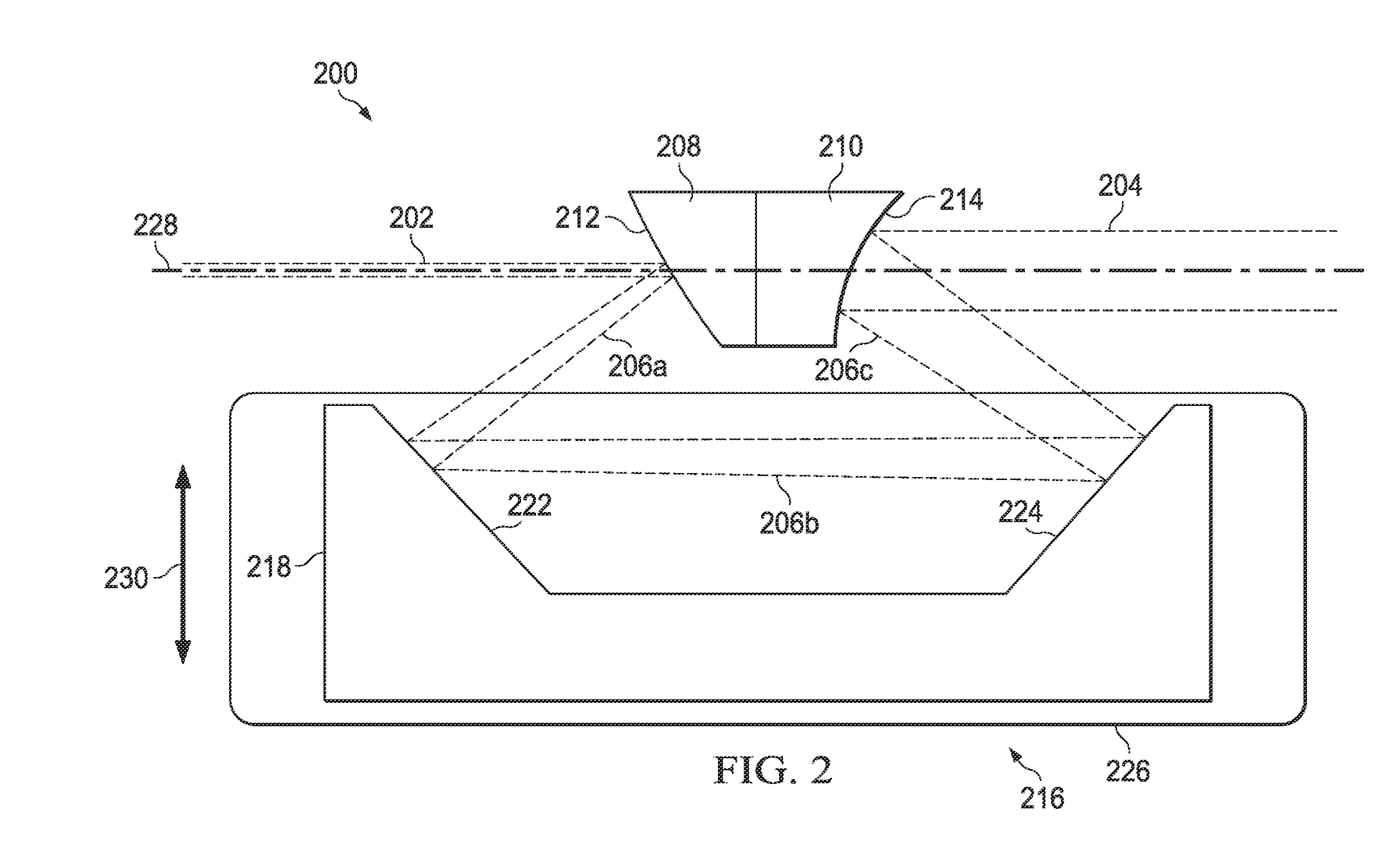
FIG. 2 illustrates a second example compact in-line reflective optical system with adjustable focus according to this disclosure.

FIG. 2 illustrates a second example compact in-line reflective optical system 200 with adjustable focus according to this disclosure. In some embodiments, the system 200 of FIG. 2 receives an input beam 202, provides an output beam 204 having a larger cross-sectional size, and generates intermediate beams 206a-206c. In other embodiments, the input optical beam 202 and the output optical beam 204 can be reversed (meaning the input optical beam 202 enters on the right and the output optical beam 204 exits on the left in FIG. 2), where the output optical beam 204 has a smaller cross-sectional size than the input optical beam 202. The system 200 of FIG. 2 includes powered mirrors 208, 210 with reflective surfaces 212, 214. The input beam 202 and the output beam 204 can share a common optical axis 228. These components and elements in FIG. 2 may be the same as or similar to corresponding components and elements in FIG. 1 described above.

As shown in FIG. 2, the system 200 here includes a retro-reflective element 216 that includes an integrated or monolithic optic 218 having multiple reflective surfaces 222 and 224. The reflective surfaces 222 and 224 may represent polished or other reflective surfaces of the integrated or monolithic optic 218 itself or reflective surfaces formed on or attached to the integrated or monolithic optic 218. The retro-reflective element 216 also includes an adjustable stage, plate, or other support structure 226 on which the integrated or monolithic optic 218 is mounted or otherwise attached.

In FIG. 2, the focusing of the output beam 204 can be controlled based on movement of the retro-reflective element 216 along an axis 230, which may be substantially or completely transverse to the optical axis 228 of the input beam 202 and the output beam 204. The use of an integrated or monolithic optic 218 in the retro-reflective element 216 may be useful or desirable in some cases since it may be easier to establish a fixed alignment of the reflective surfaces 222 and 224 compared to the use of separate mirrors 118 and 120.

Figure 3:
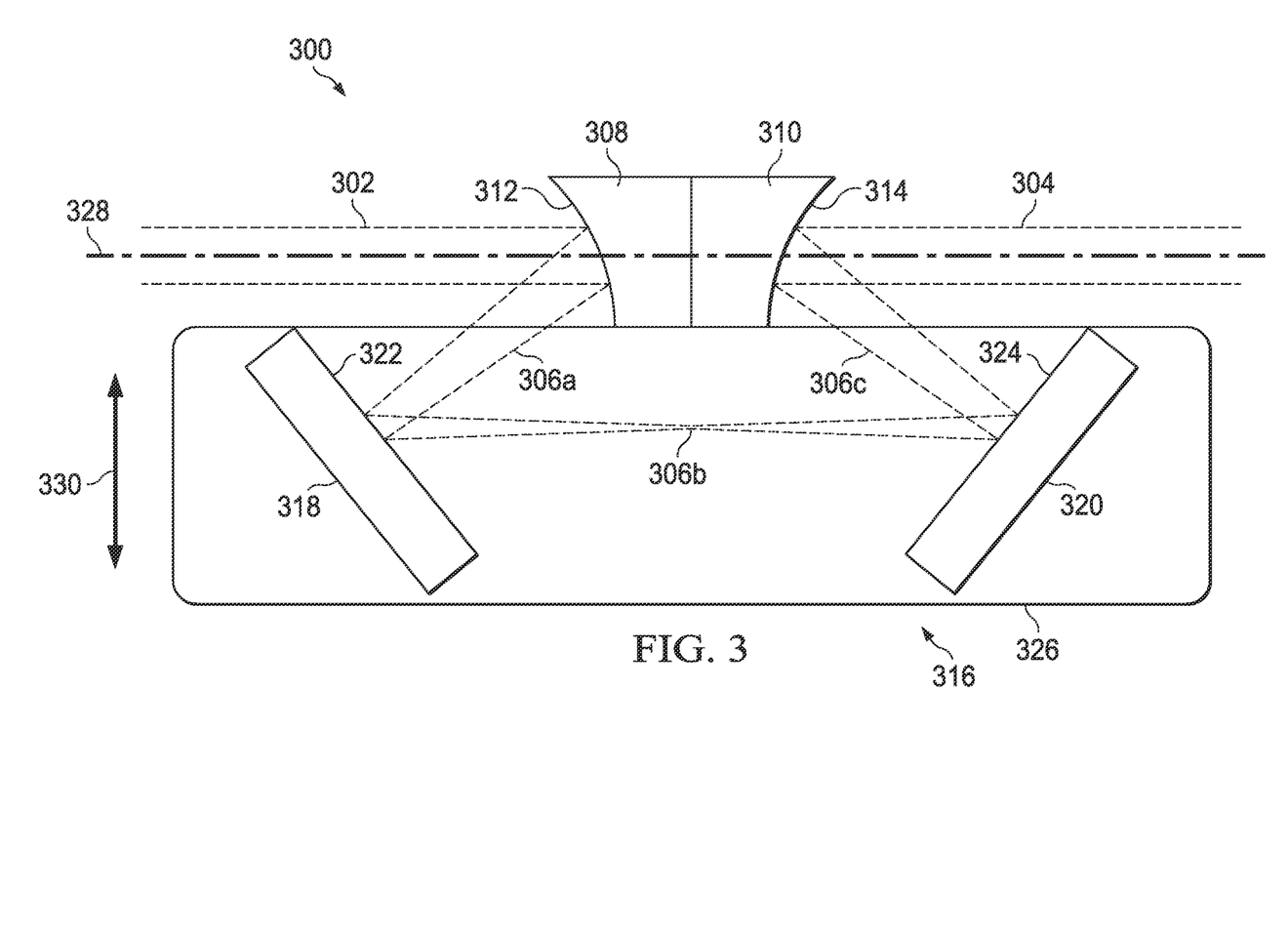
FIG. 3 illustrates a third example compact in-line reflective optical system with adjustable focus according to this disclosure.

FIG. 3 illustrates a third example compact in-line reflective optical system 300 with adjustable focus according to this disclosure. The system 300 of FIG. 3 receives an input beam 302, provides an output beam 304 having an equal or different cross-sectional size (based on parameters described below), and generates intermediate beams 306a-306c. The system 300 of FIG. 3 includes powered mirrors 308 and 310 that respectively have reflective surfaces 312 and 314. The system 300 also includes a retro-reflective element 316 having multiple mirrors 318 and 320. The mirror 318 includes a flat or substantially flat reflective surface 322, and the mirror 320 includes a flat or substantially flat reflective surface 324. The retro-reflective element 316 also includes an adjustable stage, plate, or other support structure 326 on which the mirrors 318 and 320 are mounted or otherwise attached. The input beam 302 and the output beam 304 can share a common optical axis 328, and the retro-reflective element 316 is movable along an axis 330 to adjust the focus of the output beam 304. While not shown here, the retro-reflective element 216 of FIG. 2 may be used in place of the retro-reflective element 316.

Many of the components and elements in FIG. 3 may be the same as or similar to corresponding components and elements in FIG. 1 described above. However, in this example, the powered mirror 308 has a concave reflective surface 312 rather than a convex reflective surface. Because of this, the powered mirror 308 produces an intermediate focus that occurs before the reflective surface 314 of the powered mirror 310. Depending on the implementation, the intermediate focus produced by the powered mirror 308 may occur before the reflective surface 322 of the mirror 318, between the reflective surfaces 322 and 324 of the mirrors 318 and 320, or after the reflective surface 324 of the mirror 320 (but before the powered mirror 310). In all three cases, the intermediate focus is positioned optically before the powered mirror 310.

In the particular example shown in FIG. 3, the intermediate focus produced by the powered mirror 308 occurs between the reflective surfaces 322 and 324 of the mirrors 318 and 320. In that case, the concavity of the reflective surface 312 causes the cross-sectional size of the intermediate beam 306a to decrease as the intermediate beam 306a travels towards the mirror 318. The planar nature of the reflective surface 322 of the mirror 318 allows the cross-sectional size of the intermediate beam 306b to continue decreasing as the intermediate beam 306b travels towards the mirror 320. However, the intermediate focus of the powered mirror 308 being between the mirrors 318 and 320 causes the intermediate beam 306b to stop decreasing in cross-sectional size and start increasing in cross-sectional size at some point between the mirrors 318 and 320. The planar nature of the reflective surface 324 of the mirror 320 allows the cross-sectional size of the intermediate beam 306c to continue increasing as the intermediate beam 306c travels towards the powered mirror 310. The intermediate beam 306c reflects off the reflective surface 314 of the powered mirror 310 as the output beam 304. The non-planar nature of the reflective surface 314 helps to reduce or stop the increase in the cross-sectional size of the output beam 304. Note that while the intermediate beam 306b in this example decreases and then increases in cross-sectional size, this reversal may actually occur to the intermediate beam 306a or 306c depending on the location of the intermediate focus of the powered mirror 308.

In some cases, the intermediate focus of the powered mirror 308 occurs at a location that is equidistant between the reflective surfaces 322 and 324 of the mirrors 318 and 320, and the output beam 304 may have the same or substantially the same cross-sectional size as the input beam 302. Essentially, the system 300 here would be providing a magnification of "one," which may be useful in some applications (such as those where there is a need or desire to control the output divergence without expanding or reducing an optical beam). In other cases, the intermediate focus of the powered mirror 308 occurs at another location along the optical path of the intermediate beams 306a-306c, and the output beam 304 may have a larger or smaller cross-sectional size compared to the input beam 302.

Figure 4:
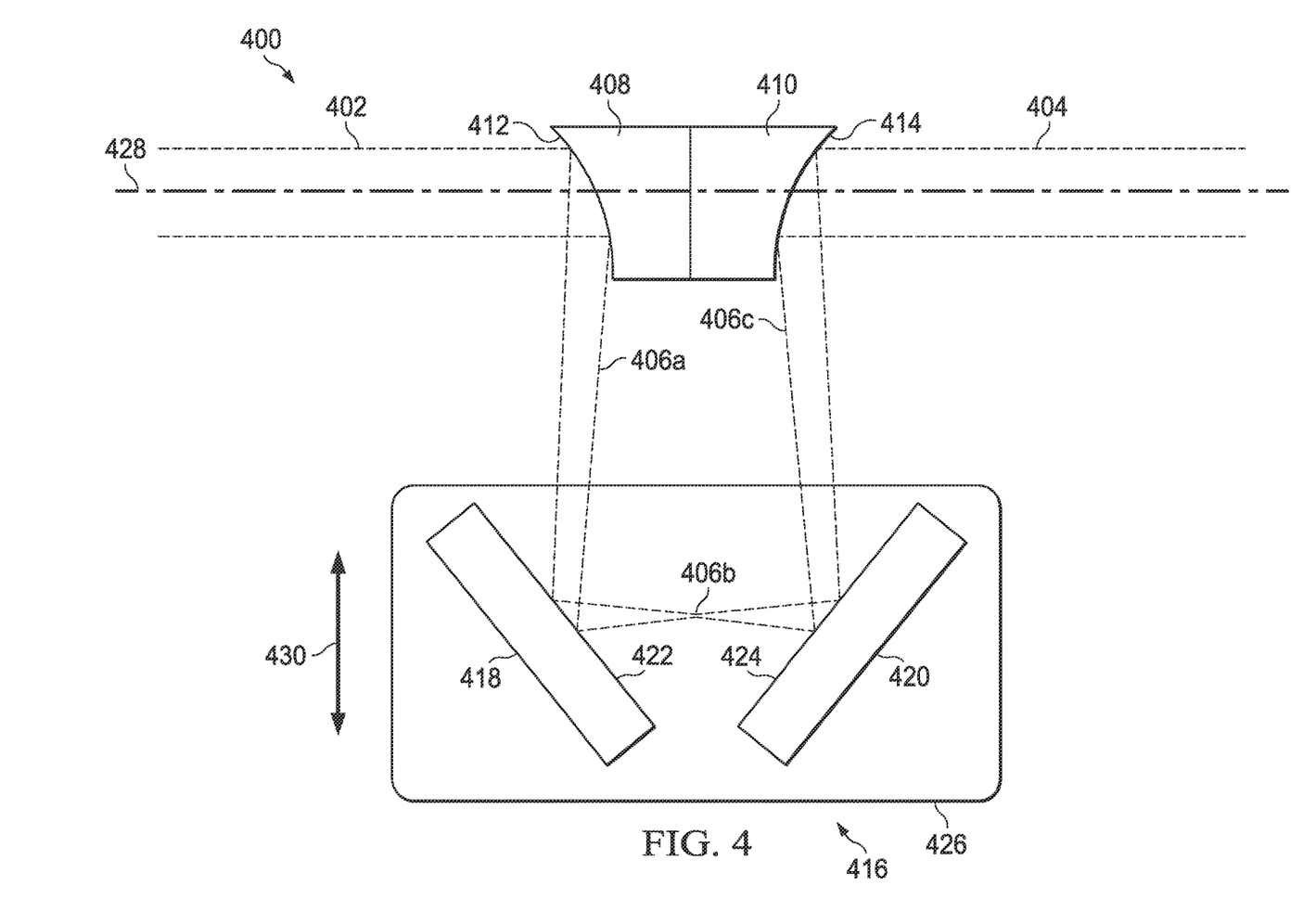
FIG. 4 illustrates a fourth example compact in-line reflective optical system with adjustable focus according to this disclosure.

FIG. 4 illustrates a fourth example compact in-line reflective optical system 400 with adjustable focus according to this disclosure. The system 400 of FIG. 4 receives an input beam 402, provides an output beam 404 having an equal or different cross-sectional size, and generates intermediate beams 406a-406c. The system 400 of FIG. 4 includes powered mirrors 408 and 410 that respectively have reflective surfaces 412 and 414. The system 400 also includes a retro-reflective element 416 having multiple mirrors 418 and 420. The mirror 418 includes a flat or substantially flat reflective surface 422, and the mirror 420 includes a flat or substantially flat reflective surface 424. The retro-reflective element 416 also includes an adjustable stage, plate, or other support structure 426 on which the mirrors 418 and 420 are mounted or otherwise attached. The input beam 402 and the output beam 404 can share a common optical axis 428, and the retro-reflective element 416 is movable along an axis 430 to adjust the focus of the output beam 404. While not shown here, the retro-reflective element 216 of FIG. 2 may be used in place of the retro-reflective element 416.

Many of the components and elements in FIG. 4 may be the same as or similar to corresponding components and elements in FIG. 3 described above. However, in this example, the reflective surface 412 of the powered mirror 408 reflects the intermediate beam 406a at a larger angle compared to the powered mirror 308, and the reflective surface 414 of the powered mirror 410 receives the intermediate beam 406c at a larger angle compared to the powered mirror 310. In some embodiments, the reflective surface 412 of the powered mirror 408 reflects the intermediate beam 406a at an angle of 90°, and the reflective surface 414 of the powered mirror 410 receives the intermediate beam 406c at an angle of 90°. This type of arrangement may allow the retro-reflective element 416 to have a smaller size compared to the retro-reflective elements 116, 216, 316 described above.

In this example, the powered mirror 408 produces an intermediate focus, which may occur before the reflective surface 422 of the mirror 418, between the reflective surfaces 422 and 424 of the mirrors 418 and 420, or after the reflective surface 424 of the mirror 420. In this example, the powered mirror 408 produces an intermediate focus between the reflective surfaces 422 and 424 of the mirrors 418 and 420. This causes the intermediate beam 406a to decrease in cross-sectional size, the intermediate beam 406b to decrease and then increase in cross-sectional size, and the intermediate beam 406c to increase in cross-sectional size. If the intermediate focus produced by the powered mirror 408 occurs at a location that is equidistant between the reflective surfaces 422 and 424 of the mirrors 418 and 420, the output beam 404 may have the same or substantially the same cross-sectional size as the input beam 402.

Figure 5:
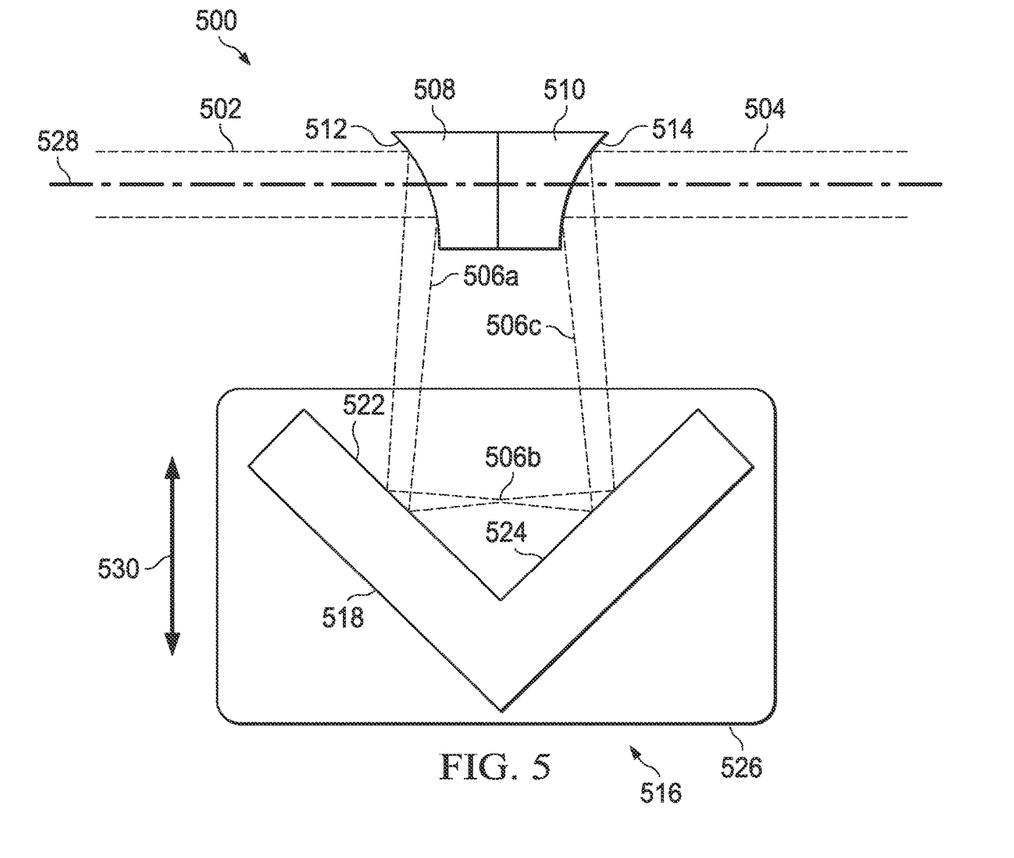
FIG. 5 illustrates a fifth example compact in-line reflective optical system with adjustable focus according to this disclosure.

FIG. 5 illustrates a fifth example compact in-line reflective optical system 500 with adjustable focus according to this disclosure. The system 500 of FIG. 5 receives an input beam 502, provides an output beam 504 having an equal or different cross-sectional size, and generates intermediate beams 506a-506c. The system 500 of FIG. 5 includes powered mirrors 508 and 510 that respectively have reflective surfaces 512 and 514. The system 500 also includes a retro-reflective element 516. The input beam 502 and the output beam 504 can share a common optical axis 528, and the retro-reflective element 516 is movable along an axis 530 to adjust the focus of the output beam 504.

Many of the components and elements in FIG. 5 may be the same as or similar to corresponding components and elements in FIG. 4 described above. However, in this example, the retro-reflective element 516 includes an integrated or monolithic optic 518 having multiple reflective surfaces 522 and 524. The reflective surfaces 522 and 524 may represent polished or other reflective surfaces of the integrated or monolithic optic 518 itself or reflective surfaces formed on or attached to the integrated or monolithic optic 518. In some cases, the integrated or monolithic optic 518 may be implemented as a custom mirror or a corner cube. The retro-reflective element 516 also includes an adjustable stage, plate, or other support structure 526 on which the integrated or monolithic optic 518 is mounted or otherwise attached. The use of an integrated or monolithic optic 518 in the retro-reflective element 516 may be useful or desirable in some cases since it may be easier to establish a fixed alignment of the reflective surfaces 522 and 524 compared to the use of separate mirrors 418 and 420. Note that while the reflective surfaces 522 and 524 of the integrated or monolithic optic 518 meet one another at a 90° here, the integrated or monolithic optic 518 may have an intervening surface between the reflective surfaces 522 and 524 (such as a horizontal surface like in the integrated or monolithic optic 218 but smaller).

Although FIGS. 1 through 5 illustrate examples of compact in-line reflective optical systems with adjustable focus, various changes may be made to FIGS. 1 through 5. For example, the sizes and shapes of various components in FIGS. 1 through 5 can vary based on a number of factors, such as the sizes of the input and output beams and the packaging of the components. Also, while specific examples of optical devices are shown in FIGS. 1 through 5, other optical devices performing the same or similar functions may be used in the systems. In addition, any suitable combination of features shown in FIGS. 1 through 5 may be used together in a single compact in-line reflective optical system with adjustable focus, whether or not that specific combination of features is shown in FIGS. 1 through 5 or described above.

Figure 6:
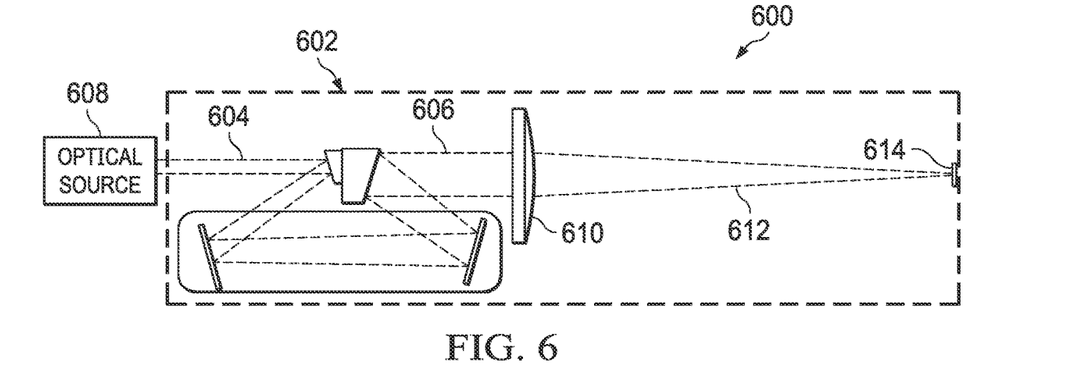
FIG. 6 illustrates an example system using a compact in-line reflective optical system with adjustable focus according to this disclosure.

FIG. 6 illustrates an example system 600 using a compact in-line reflective optical system 602 with adjustable focus according to this disclosure. Note that while the reflective optical system 602 shown in FIG. 6 may represent or be based on the reflective optical system 100 shown in FIG. 1 and described above, the system 600 may include any other suitable reflective optical system (including any of the other reflective optical systems described above).

As shown in FIG. 6, the reflective optical system 602 is receiving an input beam 604 and providing an output beam 606. The input beam 604 may be provided from any suitable source(s) 608, such as an HEL source or other laser source. In this example, the reflective optical system 602 is functioning as a beam expander to increase the cross-sectional size of the output beam 606 compared to the input beam 604. Moreover, as can be seen here, the input and output beams 604 and 606 are generally aligned and can share a common optical axis. This allows focusing of the output beam 606 using a retro-reflective element in the reflective optical system 602 while creating little or no boresight error.

The expanded output beam 606 in this example is provided to a lens 610, which generates a focused beam 612 that can be directed onto a specified target or area 614. The specified target or area 614 may be any suitable distance from the system 600, possibly including extremely large distances. Note that this particular use of the expanded output beam 606 is for illustration only. This particular use is selected since it helps to illustrate the ability of the reflective optical system 100 to change the focus of the expanded output beam 606 without introducing boresight errors.

As noted above, the reflective optical system 602 includes a retro-reflective element (such as the retro-reflective element 116, 216, 316, 416, 516) that allows the focus of the expanded output beam 606 to be adjusted. This is accomplished by moving the retro-reflective element closed to or farther from the powered mirrors 108-110, 208-210, 308-310, 408-410, 508-510 in the reflective optical system 602. This allows the focus of the focused beam 612 to be changed as needed to account for various focus errors in the system 600. In a conventional approach, the input beam 604 may be reflected from a first powered mirror, reflected from a second (off-axis) powered mirror, and output through the lens 610. In that approach, changing the spacing between the powered mirrors by moving one or both of the powered mirrors can introduce significant boresight errors.

Although FIG. 6 illustrates one example of a system 600 using a compact in-line reflective optical system 602 with adjustable focus, various changes may be made to FIG. 6. For example, while the reflective optical system 602 is shown here as operating as a beam expander, the reflective optical system 602 may operate as a beam reducer or provide an overall magnification of one using the various approaches described above.

Figure 7A:
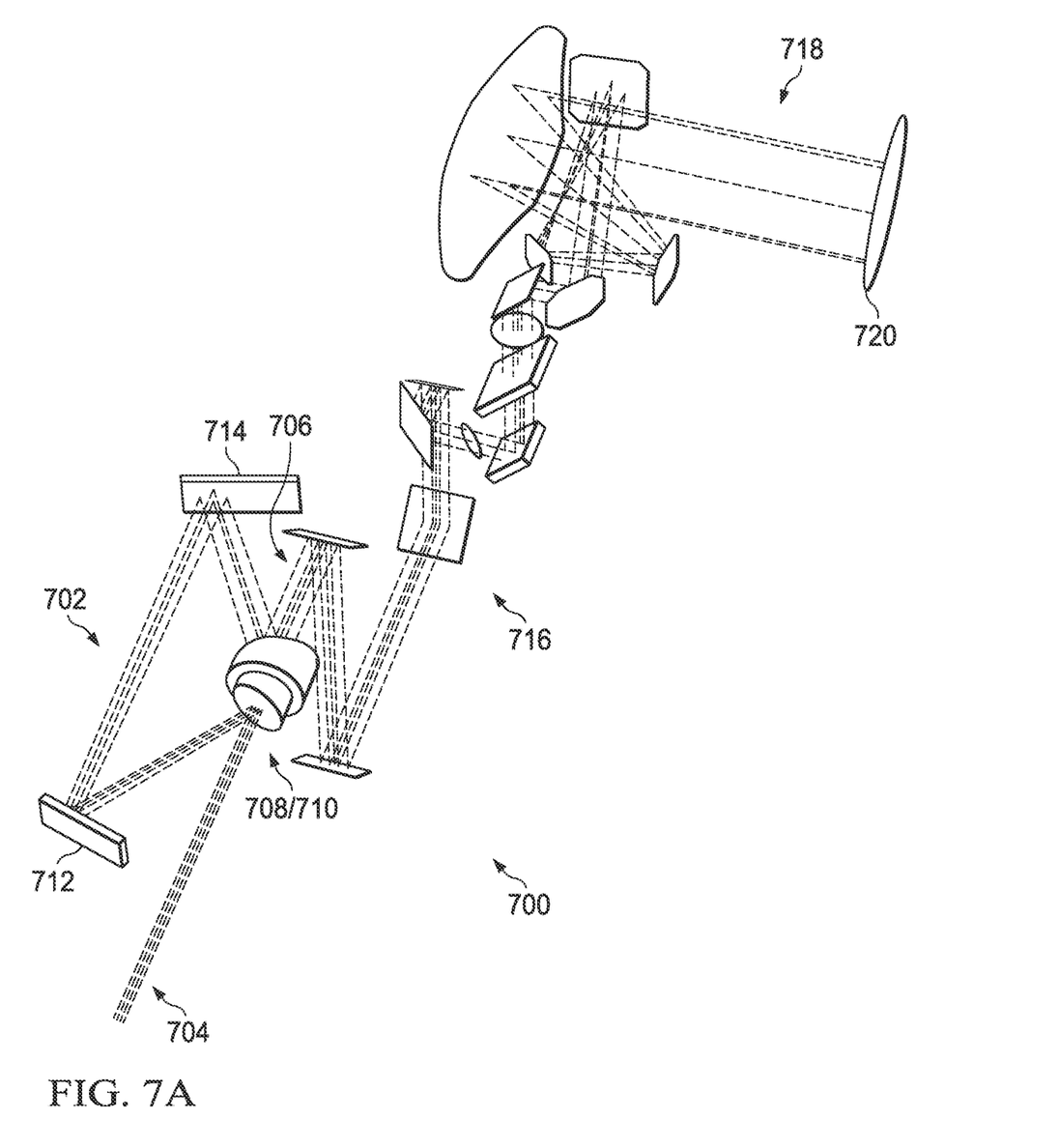
FIGS. 7A through 7C illustrate example operations in a system that includes a compact in-line reflective optical system with adjustable focus according to this disclosure.
Figure 7B:
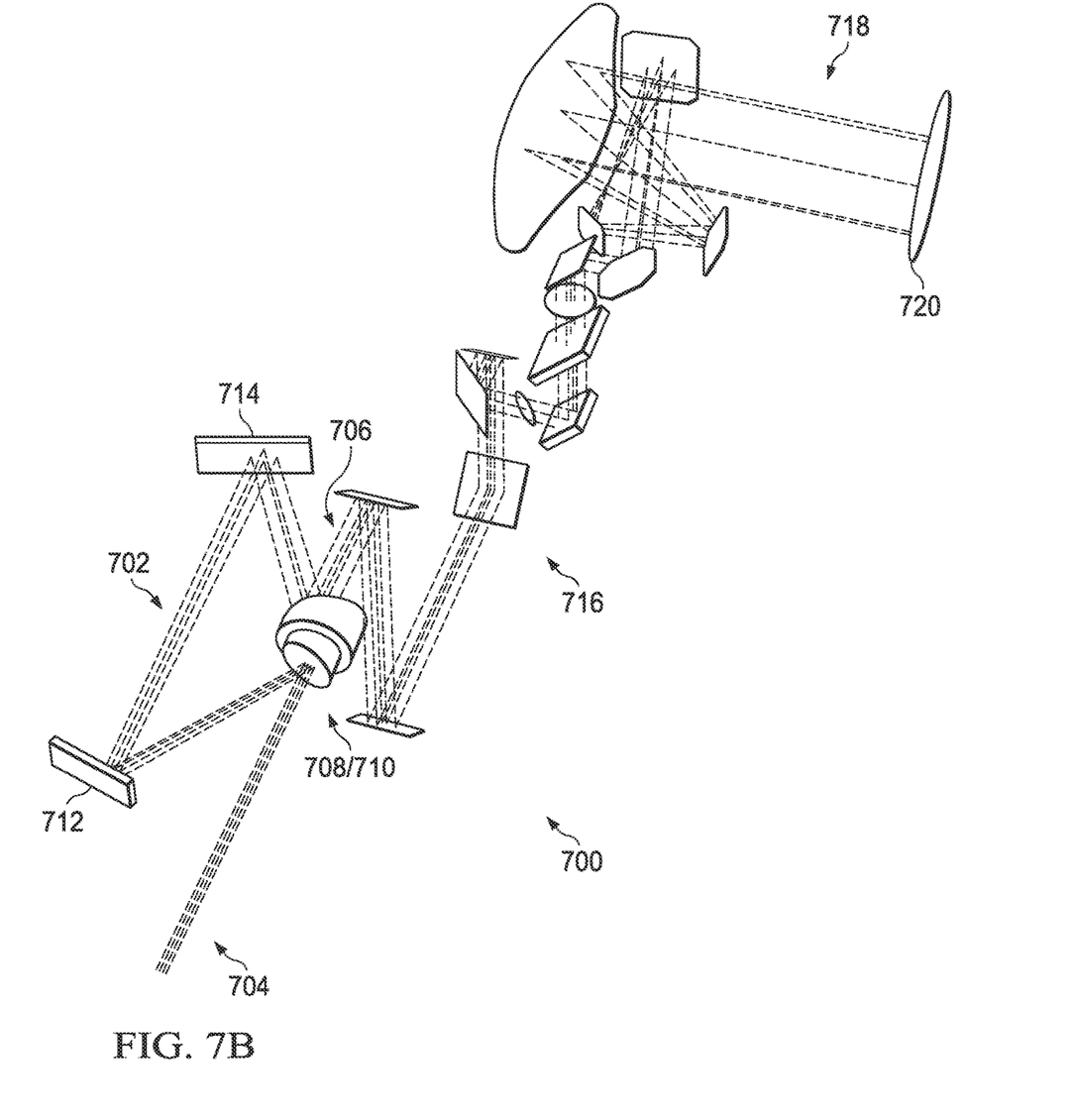
Figure 7C:
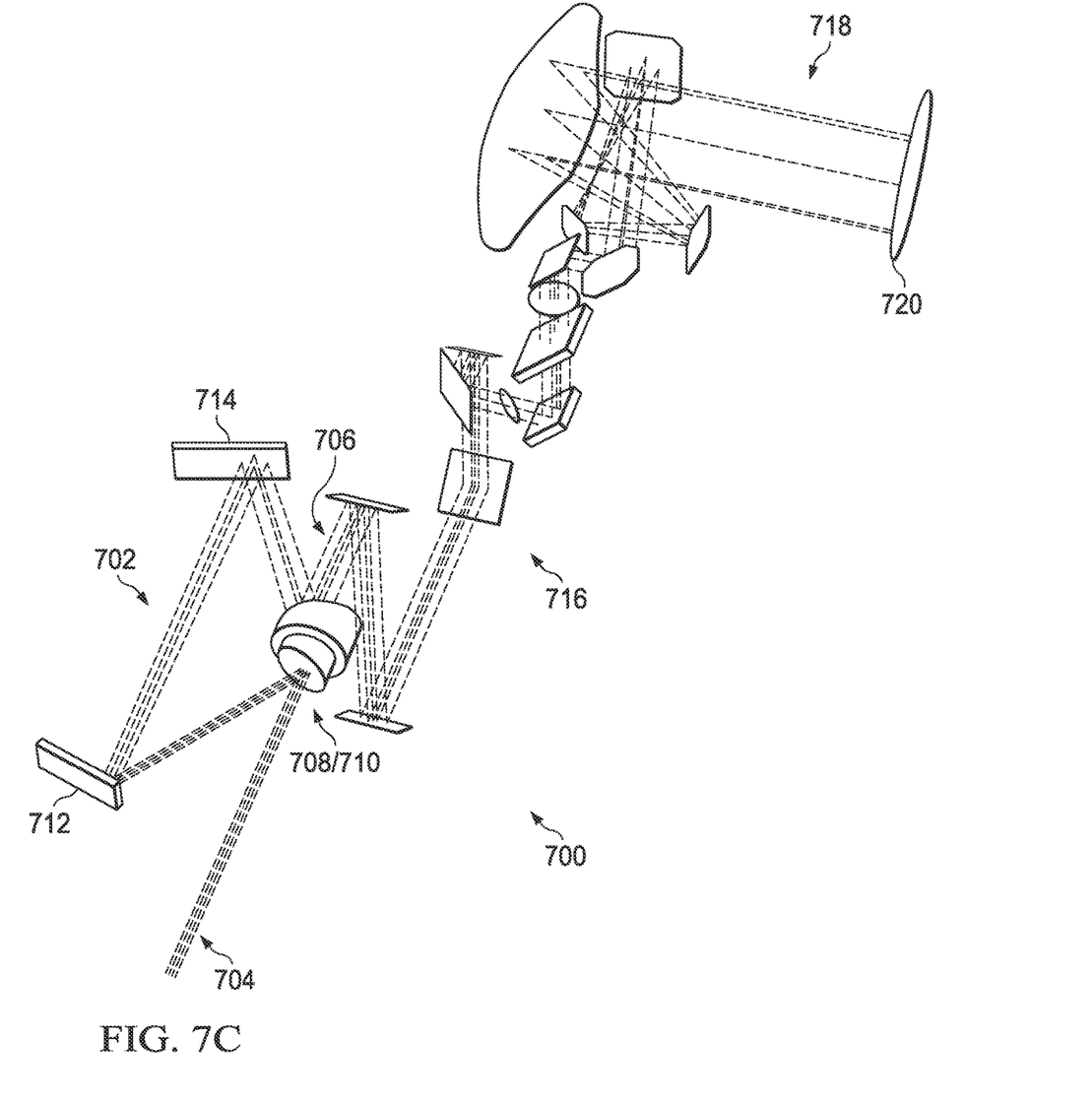

FIGS. 7A through 7C illustrate example operations in a system 700 that includes a compact in-line reflective optical system 702 with adjustable focus according to this disclosure. Note that while the reflective optical system 702 shown in FIGS. 7A through 7C may represent or be based on the reflective optical system 100 shown in FIG. 1 and described above, the system 700 may include any other suitable reflective optical system (including any of the other reflective optical systems described above).

As shown in FIGS. 7A through 7C, the reflective optical system 702 receives an input beam 704 and produces an expanded output beam 706. The reflective optical system 702 here includes powered mirrors 708, 710 and mirrors 712, 714. Note that the mirrors 712, 714 may be implemented in any suitable manner, such as through the use of separate optical devices or an integrated or monolithic optic. The expanded output beam 706 here is provided to a series of additional mirrors and other optical devices 716, which generally operate to expand the beam 706 even further to produce a final output beam 718. The series of optical devices 716 also helps to position the final output beam 718 for output through a window or aperture 720. In some embodiments, the series of optical devices 716 may be used to implement an all-reflective HEL beam director.

In FIG. 7A, the mirrors 712, 714 are positioned closest to the powered mirrors 708, 710. In FIG. 7B, the mirrors 712, 714 are positioned at an intermediate distance from the powered mirrors 708, 710. In FIG. 7C, the mirrors 712, 714 are positioned farthest from the powered mirrors 708, 710. These different positions of the mirrors 712, 714 relative to the powered mirrors 708, 710 are associated with different optical path distances between the powered mirrors 708, 710. Even if these optical path distances differ by a very small amount, this provides for some desired amount of focus control for the expanded output beam 706. This focus control for the expanded output beam 706 translates into some desired amount of focus control for the final output beam 718.

Although FIGS. 7A through 7C illustrate one example of operations in a system 700 that includes a compact in-line reflective optical system 702 with adjustable focus, various changes may be made to FIGS. 7A through 7C. For example, while the reflective optical system 702 is shown here as operating as a beam expander, the reflective optical system 702 may operate as a beam reducer or provide an overall magnification of one using the various approaches described above. Also, the specific series of optical devices 716 shown here is for illustration only, and the output beam 706 may be used in any other suitable manner.

Figure 8:
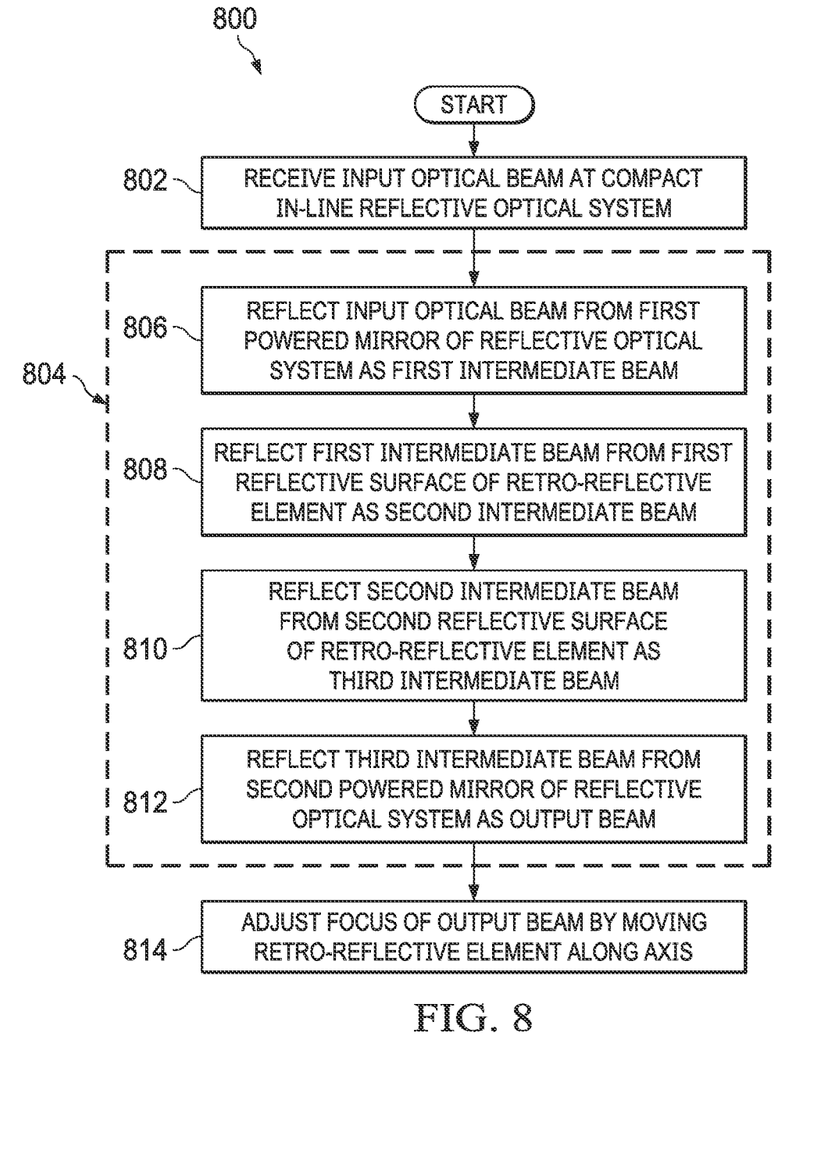
FIG. 8 illustrates an example method for using a compact in-line reflective optical system with adjustable focus according to this disclosure.

FIG. 8 illustrates an example method 800 for using a compact in-line reflective optical system with adjustable focus according to this disclosure. For ease of explanation, the method 800 is described as involving the use of one of the compact in-line reflective optical systems shown in FIGS. 1 through 7. However, the method 800 may involve the use of any other suitable compact in-line reflective optical system designed in accordance with this disclosure.

As shown in FIG. 8, an input optical beam is received at a compact in-line reflective optical system at step 802. This may include, for example, the compact in-line reflective optical system 100, 200, 300, 400, 500, 602, 702 receiving the input optical beam 102, 202, 302, 402, 502, 604, 704. The input optical beam may represent any suitable optical beam, such as a high-energy laser (HEL) beam or other laser beam or other beam of optical energy.

The input optical beam is processed using the reflective optical system to generate an output beam at step 804. This may include, for example, the reflective optical system operating to expand, reduce, or maintain the cross-sectional size of an output beam 104, 204, 304, 404, 504, 606, 706 relative to the input optical beam. To accomplish this, the input optical beam is reflected from a first powered mirror of the reflective optical system as a first intermediate beam at step 806. This may include, for example, the input optical beam being reflected from the powered mirror 108, 208, 308, 408, 508 as the intermediate beam 106a, 206a, 306a, 406a, 506a. The first intermediate beam is reflected from a first reflective surface of a retro-reflective element as a second intermediate beam at step 808. This may include, for example, the first intermediate beam being reflected from the mirror 118, 318, 418 or from the integrated or monolithic optic 218, 518 as the intermediate beam 106b, 206b, 306b, 406b, 506b. The second intermediate beam is reflected from a second reflective surface of the retro-reflective element as a third intermediate beam at step 810. This may include, for example, the second intermediate beam being reflected from the mirror 120, 320, 420 or from the integrated or monolithic optic 218, 518 as the intermediate beam 106c, 206c, 306c, 406c, 506c. The third intermediate beam is reflected from a second powered mirror as an output beam at step 812. This may include, for example, the third intermediate beam being reflected from the powered mirror 110, 210, 310, 410, 510 as the output beam.

During this process, the focus of the output beam can be adjusted by moving the retro-reflective element along an axis at step 814. This may include, for example, the retro-reflective element 116, 216, 316, 416, 516 being moved along the axis 130, 230, 330, 430, 530 manually or in an automated manner to adjust the focus of the output beam. In some cases, the axis can be substantially or completely transverse to the optical axis 128, 228, 328, 428, 528 of the input and output beams.

Although FIG. 8 illustrates one example of a method 800 for using a compact in-line reflective optical system with adjustable focus, various changes may be made to FIG. 8. For example, while shown as a series of steps, various steps in FIG. 8 may overlap, occur in parallel, occur in a different order, or occur any number of times. Also, various steps may be added to or omitted from FIG. 8 as needed or desired.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
an in-line reflective optical system configured to receive an input optical beam and provide an output optical beam, the in-line reflective optical system comprising:
first and second powered mirrors aligned back-to-back, the first powered mirror configured to reflect the input optical beam as a first intermediate beam; and
first and second reflective surfaces respectively configured to reflect the first intermediate beam as a second intermediate beam and to reflect the second intermediate beam as a third intermediate beam, the second powered mirror configured to reflect the third intermediate beam as the output optical beam;
wherein a spacing between the first and second reflective surfaces and the first and second powered mirrors is adjustable to control a focus of the output optical beam without introducing boresight error in the output optical beam.

2. The apparatus of claim 1, wherein the first and second reflective surfaces form at least part of a retro-reflective element, the retro-reflective element offset from an optical axis of the input and output optical beams.

3. The apparatus of claim 1, wherein the first and second powered mirrors and the first and second reflective surfaces are configured such that the output optical beam has a different cross-sectional size than the input optical beam.

4. The apparatus of claim 1, wherein the first powered mirror is configured to produce an intermediate focus that is positioned optically before the second powered mirror.

5. The apparatus of claim 4, wherein:
the intermediate focus is positioned equidistant between the first and second reflective surfaces; and
the input optical beam and the output optical beam have substantially equal cross-sectional sizes.

6. The apparatus of claim 1, wherein at least one of:
the first and second powered mirrors are attached to each other or form a first monolithic structure; and
the first and second reflective surfaces are separate reflective optical devices or form part of a second monolithic structure.

7. The apparatus of claim 1, wherein the first and second powered mirrors are positioned along an optical axis of the input and output optical beams.

8. A system comprising:
a laser configured to generate an input optical beam; and
an in-line reflective optical system configured to receive the input optical beam and provide an output optical beam, the in-line reflective optical system comprising:
first and second powered mirrors aligned back-to-back, the first powered mirror configured to reflect the input optical beam as a first intermediate beam; and
first and second reflective surfaces respectively configured to reflect the first intermediate beam as a second intermediate beam and to reflect the second intermediate beam as a third intermediate beam, the second powered mirror configured to reflect the third intermediate beam as the output optical beam;
wherein a spacing between the first and second reflective surfaces and the first and second powered mirrors is adjustable to control a focus of the output optical beam without introducing boresight error in the output optical beam.

9. The system of claim 8, wherein the first and second reflective surfaces form at least part of a retro-reflective element, the retro-reflective element offset from an optical axis of the input and output optical beams.

10. The system of claim 8, wherein the first and second powered mirrors and the first and second reflective surfaces are configured such that the output optical beam has a different cross-sectional size than the input optical beam.

11. The system of claim 8, wherein the first powered mirror is configured to produce an intermediate focus that is positioned optically before the second powered mirror.

12. The system of claim 11, wherein:
the intermediate focus is positioned equidistant between the first and second reflective surfaces; and
the input optical beam and the output optical beam have substantially equal cross-sectional sizes.

13. The system of claim 8, wherein at least one of:
the first and second powered mirrors are attached to each other or form a first monolithic structure; and
the first and second reflective surfaces are separate reflective optical devices or form part of a second monolithic structure.

14. The system of claim 8, wherein the first and second powered mirrors are positioned along an optical axis of the input and output optical beams.

15. The system of claim 8, further comprising:
one or more optical devices configured to direct the output optical beam or a final optical beam based on the output optical beam towards a specified target or area.

16. A method comprising:
reflecting an input optical beam as a first intermediate beam using a first powered mirror;
reflecting the first intermediate beam as a second intermediate beam using a first reflective surface;

reflecting the second intermediate beam as a third intermediate beam using a second reflective surface; and reflecting the third intermediate beam as an output optical beam using a second powered mirror;

wherein the first and second powered mirrors are aligned back-to-back; and wherein a spacing between the first and second reflective surfaces and the first and second powered mirrors is adjustable to control a focus of the output optical beam without introducing boresight error in the output optical beam.

17. The method of claim 16, wherein:

the first and second reflective surfaces form at least part of a retro-reflective element, the retro-reflective element offset from an optical axis of the input and output optical beams; and the first and second powered mirrors are positioned along the optical axis of the input and output optical beams.

18. The method of claim 16, wherein the first and second powered mirrors and the first and second reflective surfaces are configured such that the output optical beam has a different cross-sectional size than the input optical beam.

19. The method of claim 16, wherein the first powered mirror is configured to produce an intermediate focus that is positioned optically before the second powered mirror.

20. The method of claim 19, wherein:

the intermediate focus is positioned equidistant between the first and second reflective surfaces; and the input optical beam and the output optical beam have substantially equal cross-sectional sizes.

\* \* \* \* \*